May 19, 1959 J. W. BLAKELY 2,887,329
ELECTRIC UNIVERSAL JOINT WITH UNITARY LOCKING MEANS
Filed Nov. 5, 1956
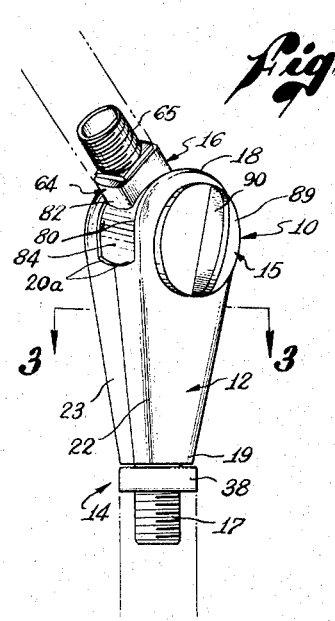
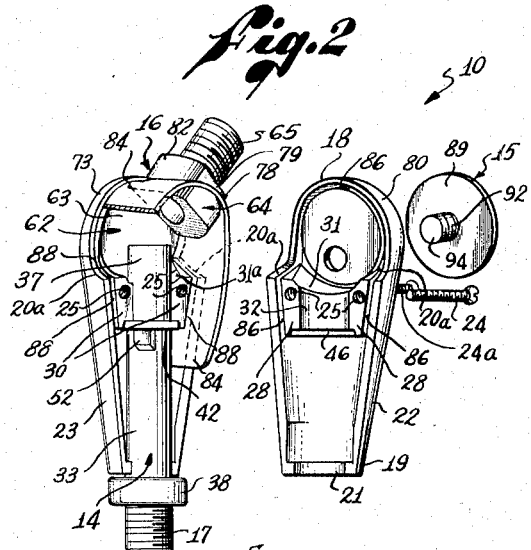
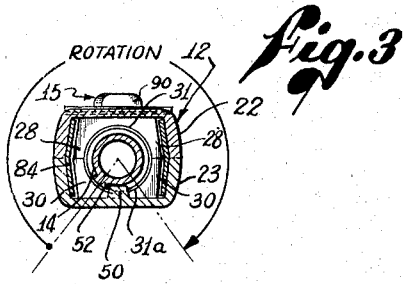
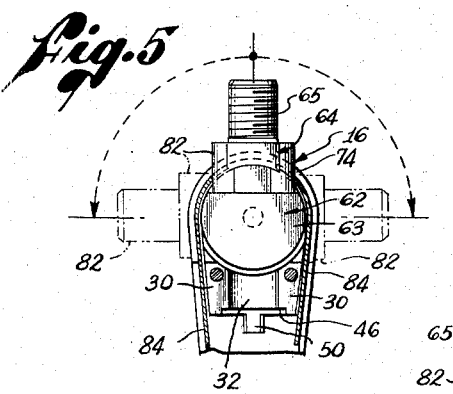
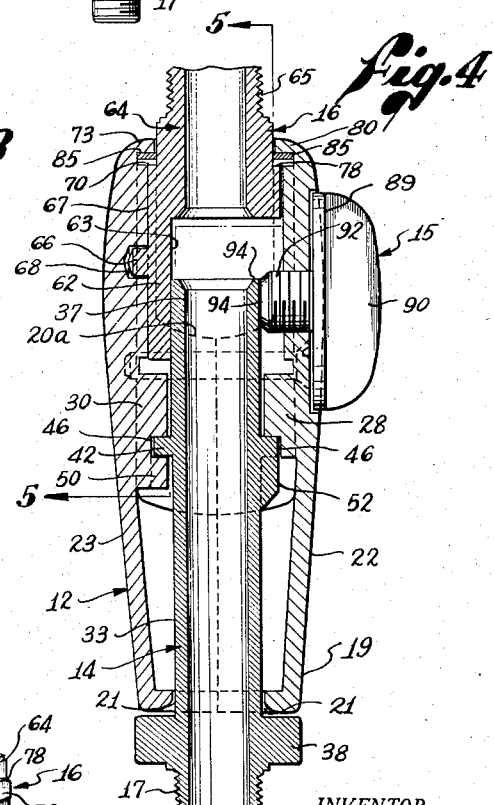
INVENTOR.
J. WARD BLAKELY
BY
ATTORNEYS

United States Patent Office 2,887,329
Patented May 19, 1959

2,887,329

ELECTRIC UNIVERSAL JOINT WITH UNITARY LOCKING MEANS

John Ward Blakely, Los Angeles, Calif.

Application November 5, 1956, Serial No. 620,283

16 Claims. (Cl. 285—168)

My invention relates generally to electric joints and especially relates to universal electric joints.

Generally speaking, electric fixtures or joints, which are adapted to assume a plurality of directions with respect to a fixed axis, are well known. Perhaps the most widely used joints are those having a ball and socket structure. These joints, however, do not enable the lighting fixture attached thereto to have a particularly large sector of rotation, inasmuch as a substantial portion of the surface area of the ball of the joint must be rotatably mounted within a tightly conforming socket, and are thus disadvantageous for many purposes.

A second main type of multi-directional joint is elongated in shape and comprises generally an elongated tubular member rotatable in substantially a 360° arc about a fixed axis, and a second member rotatable normal to this fixed axis. This type of dual-membered joint enables the lighting fixture attached thereto to have a much greater sector of rotation than the aforementioned ball and socket structure, and is consequently more advantageous.

Heretofore, each member of the dual-membered joint above-described has been usually positioned, and stably held, by two separate and distinct clamping or locking means. It has, however, been found highly advantageous for the sake of simplicity, convenience, and economy to dispense with two separate and distinct clamping means and to provide therefor a single unitary clamping means.

Moreover, the clamping means for the dual-membered joint generally comprise internal spring-loading members of some type. These do not usually provide, at one and the same time, a pair of easily rotatable yet positively locking members. Also, they do not provide a ready means of manual adjustment in the event the spring-loading members should not prove sufficient to hold a lighting fixture in place.

Accordingly, it is a major object of the present invention to provide a dual-membered joint of the type above-described in which a single, unitary clamping means simultaneously locks both of the rotational members in a desired position.

It is another object of the present invention to provide a dual-membered joint of the type described above a single, unitary locking means that is manually adjustable to permit ready rotation of the members with respect to each other, and which may, at the same time, be positively locked with respect to each other.

Still another object of the present invention is to provide an improved dual-membered joint of the type described in which the number of individual parts therein are reduced.

Yet another object of the present invention is to provide a dual-membered joint of the type described in which all internally-mounted clamping means are eliminated.

It is still another object of the present invention to provide in a dual-membered joint of the type described a simple and effective means for limiting rotation of one of the rotational members therein.

These and other objects of the present invention will become clearly understood by referring to the following description, and to the accompanying drawings, in which:

Figure 1 is a perspective view of the multi-directional joint of my invention;

Figure 2 is a perspective view of the joint of my present invention with one-half of the housing removed to reveal the interior contents thereof;

Figure 3 is a cross-sectional view along line 3—3 of Figure 1;

Figure 4 is a cross-sectional view along line 4—4 of Figure 1;

Figure 5 is a cross-sectional view along line 5—5 of Figure 4; and

Figure 6 is a perspective view of the swivel member of my present invention.

Referring especially now to Figures 1 and 2, the electrical multi-directional joint of my invention is designated by the numeral 10. The joint 10, in general, comprises an elongated housing member 12 partially enclosing a tubular conduit member 14, the conduit member 14 and the housing member 12 being rotatably mounted with respect to each other about the axis of the conduit member itself. A swivelly mounted stud member 16 is mounted within the housing 12 and is rotatable therewith, and also rotates about an axis that is normal to the axis of the conduit member 14. The swivel member 16 lies adjacent, and overlaps, the internal end of the conduit member 14.

A lighting fixture (not shown) may be affixed to either the swivel member 16 or to the conduit member 14. However, it is preferable to attach the lighting fixture to the swivelly mounted member 16 and to attach the protruding threaded end 17 of the conduit 14 to a suitable electric wire-containing fixed bracket or support (not shown). Upon attaching the end 17 of the conduit member 14 to a fixed point, such as the aforementioned bracket, the housing member 12 may be rotated axially about the conduit member 14, the swivel member 16, rotating therewith, also being independently transversely rotatable to the axis of rotation of the conduit member to thereby position the lighting fixture in practically any desired position. A single, unitary, manually adjustable locking means, such as thumbscrew 15, then simultaneously locks both the housing member 12 and swivel member 16 when a desired position of the lighting fixture is attained in a manner to be described hereafter in detail.

The elongated housing member 12 of the joint 10 tapers smoothly and continuously from a broad, rounded end 18 to a relatively narrow, flat end 19. The housing 12 has an elongated slot 20 formed in the rounded end 18 thereof, a line drawn between the opposed ends 20a of the slot 20 being normal to the longitudinal axis of the housing member 12. The housing member 12 also has a circular opening 21, as best shown in Figures 2 and 4, provided in its flattened end 19, the circular opening being preferably axially aligned with the longitudinal axis of the housing member. The interior of the housing member 12 is hollow and defines generally an axially aligned circular passage which communicates with the slot 20 and the opening 21.

For ease in manufacturing and assembly, the housing member 12 is preferably split along its longitudinal axis into a pair of tapered cover units 22 and 23 held together by any suitable means, such as by a pair of screws 24, 24a. The screws 24, 24a pass through threaded openings 25 provided in spaced posts 28 and 30, said posts being affixed to the inner faces of the cover units 22 and 23, respectively, as is best shown in Figure 2.

A pair of semi-circular webs 31 and 31a join the spaced posts 28, and 30, respectively, and form a circular passageway 32 when the cover units 22 and 23 of the housing member 12 are joined together. The circular passageway 32 is coaxially aligned with circular opening 21 in the end 19 of the housing member 12.

An elongated tubular conduit member 14 having an outer diameter preferably just slightly less than the diameter of the passageway 32 and the opening 21, is rotatably journaled within the housing member 12, rotatably bearing upon the walls of the passageway 32 and the walls of the opening 21 thereof, as best seen in Figures 2 and 4. There is, however, a slight but sufficient clearance between the outer diameter or sleeve 33 of the conduit member 14 and the walls of the opening 21 and the passageway 32, not only to allow the conduit member 14 and the housing member 12 to be rotatable with respect to each other, but also to allow the unsupported free end 37 of the conduit member to become slightly misaligned with respect to the conduit axis, upon pressure being applied thereto, in order to facilitate the locking action to be described in detail hereafter.

The protruding end 17 of the conduit member 14 is provided with a first annular flange 38, affixed immediately adjacent the opening 21 of the housing member 12, substantially to prevent any axial movement of the conduit member inwardly toward the slotted end 18 of the housing member 12.

A second annular flange 42 is affixed to the sleeve 33 of the conduit member 14, near the free end 47 thereof, and is rotatably seated within a transversely circular groove 46 formed in the posts 28 and 30, and the web 31, 31a joining said posts, as is best indicated in Figures 2 and 4. Again, there is a slight but sufficient clearance between the walls of the groove 46 and the flange 42 to permit the conduit member 14, not only to be rotatable therein, but to permit the free end 37 thereof to become slightly misaligned, upon presure being applied thereto, in order to facilitate the locking action to be described.

A projecting pin 50 is affixed to the inner wall of the cover unit 23 immediately adjacent the groove 46 and abuts the flange 42 of the conduit member 14 to thereby prevent the conduit member from moving axially outwardly from within the housing member 12.

Referring now especially to Figure 3, as well as to Figures 2 and 4, rotation-limiting means is preferably provided for the conduit member 14 which comprises a stud 52 affixed to the sleeve 33 of the conduit member and adapted to abut the projecting pin 50 upon rotation of either the conduit member or the housing member. The abutment of the stud 52 and the pin 50 prevents rotation in excess of 360° of either member with respect to the other. While approximately a 300° arc of rotation has been shown, it is obvious that a greater degree of axial rotation may be achieved by narrowing the pin 50 and sleeve stud 52.

The swivel member 16, shown in Figure 6, comprises a disc-like section 62, a hollow conduit stud 64 affixed to the front face 63 of the disc, and an indexing projection or boss 66 centrally affixed to the opposite rear face 67 thereof, the projection being best seen in Figure 4.

The disc 62 of the swivel member 16 is rotatably mounted within the rounded end 18 of the housing member 12, the projection 66 thereof being rotatable within a conforming cavity 68 provided in the cover unit 23. The disc 62 itself is rotatably seated within the cover unit 23, the peripheral edge 70 of the disc being spaced from the arcuate lip 73, which forms one-half of the rounded end 18 of the housing member 12. A section of the front face 63 of the disc 62 lies tangentially adjacent, and overlaps, the sleeve 33 of the free end 37 of the conduit member 14.

The conduit stud 64 of the swivel member 16 is provided with an externally threaded end 65 which projects through the slot 20 of the housing member 12, and an arcuate shoulder 78 formed on the upper face 79. The generally arcuate lip 80 of the cover unit 22, which forms half of the rounded end 18 of the housing member 12 and is aligned with the lip 73, rotatably bears against the shoulder 78 on the upper face 79 of the conduit stud 64. The swivel member 16, while being thus held within the rounded end 18 of the housing member 12, is rotatable about an axis which is normal to the axis of the conduit member 14.

The degree of transverse rotation of the rotatable swivel member 16 is limited to about 180°, as is shown in Figure 5. The slightly convex sides 82 of the conduit stud 64, shown by the phantom lines at their extreme positions, abut the transversely aligned concave ends 20a of the slots 18, to thereby prevent any further transverse rotational movement therebeyond.

The electric wires for attachment to the light fixture (not shown) are passed through the conduit member 14 and through the conduit stud 64 of the swivel member 16. The conduit stud 64 is so positioned on the disc 62 as to be spaced from the free end 37 of the conduit member, and regardless of the relative movement between these members, the electric wires will thus not be pinched or otherwise injured.

In order that the housing member 12 be entirely enclosed, and still readily enable transverse rotation of the swivel member 16 to take place, as above-described, a curved strip 84 of pliable sheet material is provided which encloses the slot 20 and is affixed to the conduit stud 64 so as to move therewith, regardless of its position with respect to the conduit member.

The strip 84 has a slot centrally formed therein adapted to receive the conduit 64, the upper and lower edges 85 defining the slot adapted to bear against the arcuate shoulder 78 of the stud 64, and the peripheral edge 70 of the disc 62, respectively, as best seen in Figure 4.

The top and bottom edges of the strip 84 are movably retained within ways 86 and 88 formed in the cover units 22 and 23, respectively, as follows: the transversely rotatable disc 62 is spaced from the arcuate lip providing an arcuate way 86 therebetween. The ends of the way 86 extend towards the narrow end 19 of the housing member 12 following generally the contour thereof, thus forming a path between the wall of the cover unit 23 and the posts 30. A second way 88 is formed within the mating cover unit 22 and is aligned with the way 86, as is best shown in Figure 2. The arcuate sections of the aligned ways 86 and 88 are also aligned with the arcuate shoulder 78 of the conduit stud 64 so that as the strip 84 is brought into position and abuts the shoulder 78, the edges of the strip automatically will be received by the aligned ways.

The strip edges retained within the ways 86 and 88 move therein as the swivel member 16 rotates. As the strip moves beyond the end of the ways 86, 88, as shown especially in Figure 2, sufficient space is provided within the housing member 12 to permit such movement. Since the strip 84 is of sufficient length and width to enclose the slot 20 of the housing member 12 and be retained within the ways 86, 88, it can be seen that the slot will be completely enclosed while still allowing the stud 64 to rotate in a transverse direction, as previously described.

The normal length of the strip 84 is shown in Figure 5 as extending slightly beyond the posts 28, 30, and is approximately twice the distance of the transverse rotation of the swivel member 16, and preferably greater.

The strip 84, it should be noted, does not retain the swivel member 16 in a fixed position with respect to the conduit axis, but, on the contrary, is fairly loosely held within the ways 86, 88 of the housing member 12 so as to permit ready and free rotation of the swivel member 16. Further, the strip 84 has a radius of curvature, in its central portion, substantially equal to the radius of curvature of the arcuate section of the aligned ways 86, 88 and stud shoulder 78 which prevents the ends of the strip from any substantial frictionally bearing pressure against the ways, thereby not inhibiting the ready and free rotation of the swivel member 16.

To this point, it is seen that an electric multi-directional joint 10 has been described having a housing member 12 and conduit member 14 enclosed therein, and rotatable with respect thereto about the axis of the conduit member, a swivel member 16 carried by the axially rotatable housing member and rotatable therewith, the swivel member being independently transversely rotatable about an axis normal to the conduit axis. As mentioned, it is preferable to attach the lighting fixture (not shown) to the swivelly mounted threaded end 65 rather than to the axially rotatable conduit threaded end 17. The threaded end 17 is then connected to a bracket element of an electric source (not shown), said bracket element being fixed.

Upon attaching the conduit member 14 to a fixed bracket element, the housing member 12 is axially rotatable thereabout, and the swivelly mounted member 16 transversely rotatable with respect to the housing member 12. Both the housing member 12 and the swivelly mounted member 16 are freely rotatable except for the rotation-limiting means heretofore described. In order to positively position the housing member 12 and the swivelly mounted member 16 in any particular position, a single, unitary, manually adjustable means, such as thumbscrew 15, is provided which simultaneously locks both the housing member 12 and the swivelly mounted member 16 in any desired position.

Referring now especially to Figures 2 and 4, the thumbscrew 15, comprising an enlarged circular head 89, a handle 90 therefor, and a screw 92, is threadably mounted within the housing member 12 adjacent the free end 37 of the conduit member 14. Upon rotation, the thumbscrew 15 moves radially inwardly towards the free end 37 until the end 94 thereof tangentially frictionally bears against the sleeve 33 of the free conduit end. As previously described, the free end 37 of the conduit member 14 is adapted to be moved slightly radially because of the clearance between the conduit member and the bearing opening 21 and the passageway 32. Thus, the pressure exerted by the frictionally bearing thumbscrew 15 upon the free end 37 is instantaneously transferred to the immediately adjacent overlapping front disc face 63 by means of direct abutment of the sleeve 33 of the free end 37 of the disc face.

It is thus seen that the housing member 12 is locked with respect to the conduit member 14 by means of the rotation-preventing thumbscrew 15 frictionally bearing on the free end 37 of the conduit member, and that the swivel member 16 is, in turn, locked with respect to the conduit member 14 by means of the free end 37 of the conduit member 14 frictionally bearing on the disc face 63 of the swivel member. Both housing and swivel members 12 and 16, respectively, are simultaneously locked with respect to the common conduit member 14, the simultaneous locking action for both housing and swivel members being provided by a single, unitary, manually adjustable clamping or locking means 15. The thumbscrew 15 can also be tightened slightly to frictionally hold the members 12, 14, and 16 so that the joint position may be adjusted without manipulation of the screw.

If the swivel member 16 is fixed to an element of an electric outlet, it is apparent that both the housing member 12 and the conduit member 14 are freely rotatable about the conduit axis and also transversely rotatable with respect thereto when the thumbscrew 15 is in its disengaged position. As the thumbscrew 15 is brought to bear against the conduit member 14, the axial rotation of the housing member 12 and the conduit member 14 is positively prevented. The instantaneous radial movement of the free end 37 of the conduit member 14, caused by the pressure of the thumbscrew 15, in turn, causes it to frictionally bear against the disc face 63 of the swivel member 62, thus simultaneously and positively preventing transverse rotational movement of the housing and conduit members 12 and 14, respectively. Thus, by a single manual adjustment, all rotation of both housing and conduit members 12 and 14, respectively, with respect to the fixed swivel member 16 is prevented.

If, as is preferable, the threaded end 17 of the conduit member 14 is fixed to an element of an electric source, it is apparent that the housing member 12 is axially rotatable about the conduit axis, and the swivel member 16 is transversely rotatable with respect thereto when the thumbscrew 15 is disengaged. Upon engagement of the thumbscrew 15 with the housing member 12, all rotation of the housing member is positively prevented. The free end 37 of the conduit member 14, which is, in effect, a cantilevered conduit member, instantaneously moves in a slightly radial direction, under the pressure exerted by the thumbscrew 15, to frictionally bear against the disc face 63 of the rotatable swivel member 16, thereby simultaneously preventing the transverse rotational movement thereof.

It is to be noted that, regardless of whether the swivel member 16 or the conduit member 14 is fixed, the thumbscrew 15, upon engaging the conduit member 14, causes an instantaneous radial movement, or slight axial misalignment, of the free end 37 of the conduit member, the free end thus frictionally bearing against the immediately adjacent disc face 63 of the swivel member to prevent any transverse rotation of the swivel and conduit members with respect to each other.

While one preferred embodiment of my connector has been shown and described herein, it is apparent that many changes and modification may be made that lie within the scope of the invention, and the same is not to be limited to the details illustrated and described, except as defined by the appended claims.

I claim:

1. An electric multi-directional joint which comprises: a rotatable housing member having first and second aligned openings; a conduit member mounted within said housing having first and second ends, the first end of which projects outwardly through the first of said housing openings, the second end of which is enclosed by said housing, said housing and conduit members being rotatable with respect to each other about the axis of said conduit member; a swivel member, carried by said housing member, transversely rotatable with respect to the axis of said conduit member and communicating with the second of said openings, said swivel member being adjacent said second enclosed end of said conduit member; and unitary, manually adjustable locking means mounted within said housing adapted to abut said enclosed end of said conduit member, said enclosed end, in turn, simultaneously abutting said swivel member, to substantially prevent any rotation of any of said members.

2. The joint of claim 1 characterized in that said enclosed end of said conduit member is slightly axially misaligned by the pressure of said locking means abutting the end thereof, said misalignment causing, in turn, the simultaneous abutment of said enclosed end with said swivel member, to substantially prevent all rotation of said members.

3. An electric multi-directional joint which comprises: a tubular conduit member having a first and a second end; a housing member having first and second aligned openings partially enclosing said conduit member, and the second end thereof, and being axially rotatable about said conduit member; a swivelly mounted conduit stud carried by said housing member that protrudes through one of said openings and communicating with, and adjacent, said second end of said conduit member, and rotatable transversely with respect to the axis thereof; and rotation-preventing means movably affixed within said housing member which comprises a thumbscrew adapted to about said second end of said conduit member, said second end, in turn, abutting said swivel member to simultaneously fix both the axial rotation of the housing member and the transverse rotation of the swivelly mounted conduit stud and a predetermined position.

4. An electric multi-directional joint which comprises: an elongated housing having an opening and a slot formed therein; an elongated tubular conduit axially mounted within said housing and having first and second opposed ends, said first end protruding outwardly through said housing opening and adapted to be attached to a fixed point, said second end being thus cantilever mounted and said rotatable housing being rotatable about the axis of said conduit; a swivel member transversely rotatable with respect to the axis of said conduit which comprises a transversely rotatable disc-like member and a hollow stud affixed thereto, and rotatable therewith, projecting through said slot, said transversely rotatable disc-like member and said second conduit end lying immediately adjacent and overlapping each other, said second conduit end communicating with, but spaced from, said hollow stud; and a thumbscrew having an end threadably mounted within said housing, whereby upon its movement inwardly toward the conduit axis, the end of said screw abuts the cantilevered end of said conduit which, in turn, forces said cantilevered conduit end slightly downwardly to frictionally bear against said immediately adjacent disc-like member of said swivel member, thereby preventing rotation of all said members.

5. An electric multi-directional joint which comprises: an elongated housing having an opening and a slot aligned with said opening formed therein; an elongated tubular conduit axially mounted within said housing and having first and second opposed ends, said first end protruding outwardly through said housing opening, said rotatable housing being rotatable about the axis of said conduit; a swivel member transversely rotatable with respect to the axis of said conduit which comprises a transversely rotatable disc-like member and a hollow stud affixed thereto, and rotatable therewith, projecting through said slot, said stud adapted to be attached to a fixed point, said disc-like member and said second conduit end lying immediately adjacent and overlapping each other, said second conduit end communicating with, but spaced from, said hollow stud; and a thumbscrew having an end threadably mounted within said housing, whereby upon its movement inwardly toward the conduit axis, the end of said screw abuts the cantilevered end of said conduit which, in turn, forces said cantilevered conduit end slightly downwardly to frictionally bear against said immediately adjacent disc-like member of said swivel member, thereby preventing rotation of all of said members.

6. The electric multi-directional joint, as defined in claim 4, characterized in that the rotation of said housing member with respect to said conduit is limited to slightly less than 360°, said rotation-limiting means comprising a pair of projections, one projection being affixed to the outer periphery of said conduit and one projection being affixed to the inner face of said housing member, said projections being adapted to abut each other upon rotation of said housing member with respect to said conduit, thus preventing full 360° rotation.

7. The electric multi-directional joint of claim 4 characterized in that said conduit has an annular flange fixed to its outer periphery and has an immediately adjacent shoulder projection affixed to the inner face of said housing member to thereby substantially prevent any axially outward movement of said conduit from within said housing member.

8. An electrical multi-directional fittting which comprises: an elongated housing having a circular passage and an elongated slot formed therein at axially opposed ends; a shoulder pin affixed to the inner wall of said housing intermediate said passage and slot; an elongated tubular conduit axially rotatably mounted within said housing and having first and second opposed ends, said first end protruding outwardly through said passage of said housing and said second end being enclosed within said housing, said rotatable housing being rotatable about the axis of said conduit; an annular flange affixed to the outer periphery of said conduit; a sleeve stud affixed to the outer periphery of said conduit adjacent said annular flange, said sleeve stud adapted to abut said shoulder pin to thereby limit the axial rotation of said housing member to less than 360°, said shoulder projection being affixed between said flange and said passage and immediately adjacent said flange to prevent any axially outward movement of said housing with respect to said conduit; a swivel member, rotatable transversely in a 180° arc about an axis normal to the axis of said conduit, comprising a transversely rotatable disc and a hollow stud affixed thereto projecting through said slot of said housing member, said transversely rotatable disc and said conduit lying immediately radially adjacent and overlapping each other, said second enclosed end of said conduit communicating with, but spaced from, said hollow stud; and a set screw having the end thereof mounted adjacent said housing and movable in a direction approximately normal to said conduit axis and aligned with the axis of transverse rotation of said swivel member, whereby upon movement radially toward the conduit axis, the screw end abuts the second end of said conduit, in turn forcing said conduit end slightly downwardly to abut said radially adjacent overlapping disc of said swivel member, thereby preventing rotation of said housing, swivel, and conduit members with respect to each other.

9. An electric multi-directional fitting as defined in claim 8 characterized in that said slot is substantially completely enclosed by a generally circular pliable strip movable with said stud within said housing member.

10. An electric multi-directional joint which includes: a housing having axially opposite open ends; a hollow stud rotatably mounted within said housing at one of the open ends thereof and adapted to pass a conductor through said one open end; a tubular conduit rotatably mounted in said housing for rotation about an axis intersecting the axis of rotation of said stud, said conduit at one end communicating with said stud and at its other end adapted to pass said conductor through the other of the open ends of said housing, said stud and conduit having confronting portions; and unitary, manually adjustable locking means on said housing engageable with one only of said stud and conduit members to force said engaged member into frictional engagement with the confronting portion of the other of said members for simultaneously locking said housing, stud, and conduit against rotation with respect to each other.

11. An electric multi-directional joint which includes: a tubular conduit; a housing member having aligned openings at opposite ends thereof coaxially rotatably mounted on said conduit and enclosing one end thereof; a hollow stud mounted in said housing for rotation about an axis intersecting the axis of said conduit, said enclosed end of said conduit communicating with, but spaced from, said hollow stud and said stud and said conduit having immediately adjacent, overlapping portions; and manually adjustable means on said housing engageable with one of said stud and conduit members to force said overlapping portions into forceful frictional engagement whereby said housing, stud, and conduit are simultaneously locked against relative movement.

12. An electric multi-directional joint which includes: a housing; a conduit axially rotatably mounted in said housing in alignment with an opening formed in said housing; a stud mounted through a slot formed in said housing oppositely to said opening and communicating with said conduit, and having a disc portion offset from the line of communication between said stud and conduit that is journaled against a cooperating portion of said housing to restrain said stud for rotation about an axis intersecting the axis of said conduit, said disc lying immediately adjacent an end of said conduit in overlapping relationship; and manually adjustable means on said housing for forcing said disc against the cooperating portion of said housing by pressure applied to said conduit to restrain rotation of said stud, conduit, and housing.

13. An electric multi-directional joint which includes: a housing having a substantially semi-cylindrical portion at one end in which an elongate slot is formed concentric with the axis of said portion; a single imperforate disc journaled for rotation about the axis of said semi-cylindrical portion against a wall portion of said housing, said disc carrying a hollow stud protruding radially outwardly through said slot; a thin, flexible strip of sheet material carried by said stud that is wider than said slot and extends on each side of said stud a distance at least equal to the length of said slot to fully conceal the interior of said housing, said strip being restrained in slot-closing configuration by ways formed in said housing; a conduit mounted in said housing for axial rotation about an axis intersecting the axis of rotation of said stud and at one end overlapping said disc to protect a conductor passing therethrough from contact with said strip, an end of said conduit lying in immediately adjacent overlapping relationship to said disc; and manually adjustable means on said housing engageable with said conduit to force said conduit against said disc which, in turn, is forced against said cooperating wall portion of said housing, thereby preventing rotation of said stud, conduit, and housing.

14. An electric multi-directional joint which comprises: an elongated housing having a circular opening at one end thereof and formed with an enlarged, substantially semi-cylindrical portion at the opposite end having an elongated slot axially opposed to said opening and concentric with said semi-cylindrical portion; a conduit rotatably mounted through said opening coaxially with the major axis of said housing; an imperforate disc in said housing mounted for rotation about the axis of said semi-cylindrical portion and bearing against a wall portion of said housing with the inner end of said conduit overlapping said disc, said disc also carrying a hollow stud whose axis intersects the axis of said conduit to establish an unobstructed passageway for a conductor therebetween, and said stud protruding radially outwardly through said slot; a thin flexible strip of a sheet material carried by said stud that is wider than said slot and extends on each side of said stud a distance at least equal to the length of said slot to fully conceal the interior of said housing, said strip being restrained in slot-closing configuration by ways formed in said housing; and manually-adjustable means on the side of said housing immediately opposite said disc engageable with said conduit to force said conduit against said disc which, in turn, is forced against said cooperating wall portion of said housing whereby said housing stud and conduit are frictionally held against relative movement.

15. An electrical multi-directional joint which includes: a housing member having a pair of aligned openings; a conduit rotatably mounted in one of said openings; a swivel member aligned with said conduit and rotatable about an axis intersecting the axis of said conduit, said swivel member being mounted in the other of said openings and having a portion overlapping a portion of said conduit; and unitary adjustable means for clamping said portions of said conduit and swivel member against one another to simultaneously fix the rotation of said conduit and swivel member at predetermined positions.

16. An electric multi-directional joint which includes: a housing having first and second aligned openings; a tubular conduit member mounted within said housing in one of said openings, said housing and conduit being axially rotatable with respect to each other about the axis of said conduit member; a hollow stud mounted within the other of said openings of said housing and rotatable with said housing, said stud having a portion overlapping a portion of said conduit and being independently rotatable about an axis transverse to said conduit axis; and unitary manually adjustable locking means for simultaneously and releasably locking the transverse and axial rotation of said stud and conduit with respect to each other.

References Cited in the file of this patent

UNITED STATES PATENTS

| | | |
|---|---|---|
| 2,476,850 | Fiori | July 19, 1949 |
| 2,617,619 | Versen | Nov. 11, 1952 |
| 2,841,417 | Mynick | July 1, 1958 |

UNITED STATES PATENT OFFICE
CERTIFICATE OF CORRECTION

May 19, 1959

Patent No. 2,887,329        John Ward Blakely

It is hereby certified that error appears in the printed specification of the above numbered patent requiring correction and that the said Letters Patent should read as corrected below.

Column 7, line 5, for "to about" read -- to abut --; line 9, for "and a" read -- at a --.

Signed and sealed this 29th day of September 1959.

(SEAL)
Attest:
KARL H. AXLINE
Attesting Officer

ROBERT C. WATSON
Commissioner of Patents